United States Patent [19]
Cage

[11] 3,901,114
[45] Aug. 26, 1975

[54] SAW ASSEMBLY
[75] Inventor: Kenneth C. Cage, Marysville, Wash.
[73] Assignee: The Black Clawson Company, Middletown, Ohio
[22] Filed: Oct. 11, 1973
[21] Appl. No.: 405,466

[52] U.S. Cl. .................. 83/340; 83/310; 83/335; 83/346; 83/672; 83/658
[51] Int. Cl...... B26d 1/56; B23d 25/02; B23d 45/18
[58] Field of Search ............ 83/342, 340, 335, 346, 83/310, 658, 672

[56] References Cited
UNITED STATES PATENTS

| | | | |
|---|---|---|---|
| 232,691 | 9/1880 | Cunningham | 83/340 |
| 1,973,526 | 9/1934 | Diamond et al. | 83/340 X |
| 3,504,718 | 4/1970 | Pittman et al. | 83/340 |
| 3,628,410 | 12/1971 | Shields | 83/335 |

*Primary Examiner*—Donald R. Schran
*Attorney, Agent, or Firm*—Biebel, French & Bugg

[57] ABSTRACT

An assembly for sawing boards or other material which includes a conveyor for carrying the material past a sawing station at which is located a rotary saw blade. The axis of rotation of the rotary blade is fixed with respect to the conveyor and the blade extends about its axis in a helix, with the radius of the blade increasing spirally from a minimum radius at its leading end to a maximum radius at its trailing end. The rotary blade is driven by a one stroke, clutch-brake which is energized each time it is desired to make a cut with the saw and automatically disengaged and the blade stopped against further rotation upon the completion of a cutting stroke, e.g., after one revolution of the blade. An anvil is provided at the sawing station for supporting the material being cut during the sawing operation and includes a fixed anvil member having an angularly disposed edge and a pivotal anvil member. The anvil provides support for the material adjacent the active cutting section of the blade during a saw cut to provide a clean cut through the material.

4 Claims, 9 Drawing Figures

SAW ASSEMBLY

BACKGROUND OF THE INVENTION

In severing stock material, such as lengths of boards, into sections of desired dimensions, it is desirable to be able to make a square cut across the board as it moves with a continuous, non-intermittent motion along a conveyor past a sawing station. For example, U.S. Pat. Nos. 3,504,717 and 3,504,718 disclose apparatus for cutting a continuously moving strip of material.

In both of the systems disclosed in the above noted patents, a rotary saw blade is utilized which is disposed about its axis of rotation in a helical path. By a helical path is meant that the leading edge of the blade is offset longitudinally of the axis of rotation of the blade in a downstream direction from the trailing edge of the blade. This permits the axis of rotation of the blade to remain fixed with respect to the direction of movement of the conveyor and yet permits a square cut to be made across the board or other material being severed while it is being conveyed past the saw by moving the blade across the path of movement of the conveyor.

U.S. Pat. No. 3,286,569 discloses a helical cutter for synthetic fibers and a honing device therefor which, similarly to the previously noted patents, incorporates a blade which is helically disposed about the axis of rotation thereof. However, rather than the blade being moved across the material being severed, the blade is of a spiral configuration, which permits the blade to rotate about a fixed axis of rotation during the cutting stroke. By a spiral configuration is meant that the radius of the blade from its axis to its cutting edge increases progressively in a spiral from a minimum radius adjacent its leading edge to a maximum radius adjacent its trailing edge.

SUMMARY OF THE INVENTION

The present invention provides a sawing assembly which includes a conveyor for carrying material to be severed into lengths past a stationary sawing station which includes a rotary blade mounted in a helix extending about its axis of rotation and of a spiral configuration, having a progressively increasing radius from its leading to its trailing edges.

The rotary blade cooperates with an anvil at the sawing station which supports the material to provide a clean cut and prevent, for example, when sawing wood, splinters being torn from the lower surface of the material. The anvil includes a fixed anvil member having an edge extending across the conveyor at an angle such that the active cutting section of the blade is at all times during a cutting stroke a substantially constant distance from the edge of the fixed anvil member.

By the "active cutting section" is meant that portion of the cutting edge of the blade which is at any time actively engaging and sawing the material being worked upon. This point will, of course, travel along the cutting edge of the blade during a cutting stroke, beginning at the leading portion of the cutting edge and ending at the trailing portion of the cutting edge.

The fixed anvil member cooperates with a pivotally mounted anvil member which has an edge extending, when the sawing station is inactive, in spaced parallel relationship to the edge of the fixed anvil member. A cam is mounted adjacent one end of the edge of the movable anvil member and is engaged by the downstream face of the rotary blade during the initial portion of a cutting stroke and acts to begin initial pivotal movement of the movable anvil member.

As the cutting stroke proceeds, the movable anvil member pivots about its pivotal connection away from the fixed anvil member to accommodate the rotary blade. However, a point along the edge of the movable anvil member will at all times during a cutting stroke be positioned in closely spaced relationship to the active cutting section of the blade, this point progressing along the edge of the movable anvil member as the cutting stroke progresses.

Thus, at all times during a cutting stroke the material being worked upon is supported at opposite sides of the cutting blade adjacent the active cutting section thereof to provide a smooth cut through the material.

The rotary blade is motor driven and connected to the motor by a clutch-brake which permits the blade to be actuated for one cutting stroke and then deactivated and stopped, in position for a succeeding cutting stroke. This not only provides precise control of the cutting action of the blade, but permits the motor to run constantly, eliminating the necessity of overcoming initial inertia forces in the motor and associated drive system each time it is desired to make a saw cut.

DESCRIPTION OF THE PREFERRED EMBODIMENT

Figure 1:
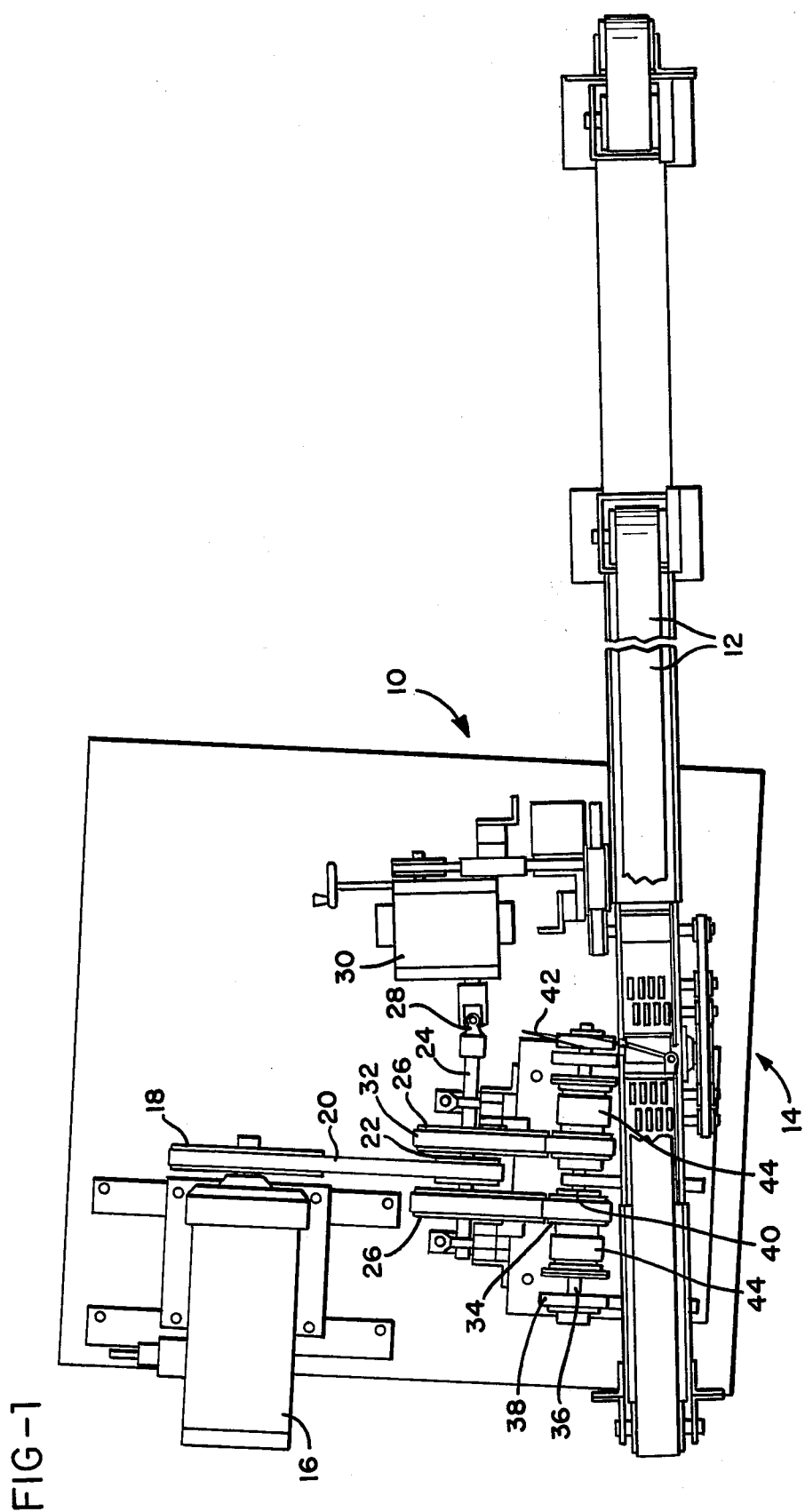
FIG. 1 is a plan view of the entire installation including saw, drive motor and conveyor belt with upper pressure rolls removed.

As seen in FIG. 1 of the drawings, a saw assembly 10 in accordance with the present invention includes a conveyor 12 moving in the direction indicated by the arrow toward a saw station, indicated in its entirety by the numeral 14. A motor 16 is provided with a pulley 18 wrapped by a belt 20 which also wraps a second pulley 22.

Pulley 22 is fixed to a shaft 24, suitably journaled, and having mounted thereon a pair of similar pulleys 26. Shaft 24 is provided with a universal joint connection 28 to a variable speed drive control 30 which, through suitable drive mechanism, powers the conveyor 12. Each of the pulleys 26 are wrapped by belts 32, which also wrap pulleys 34.

Figure 2:
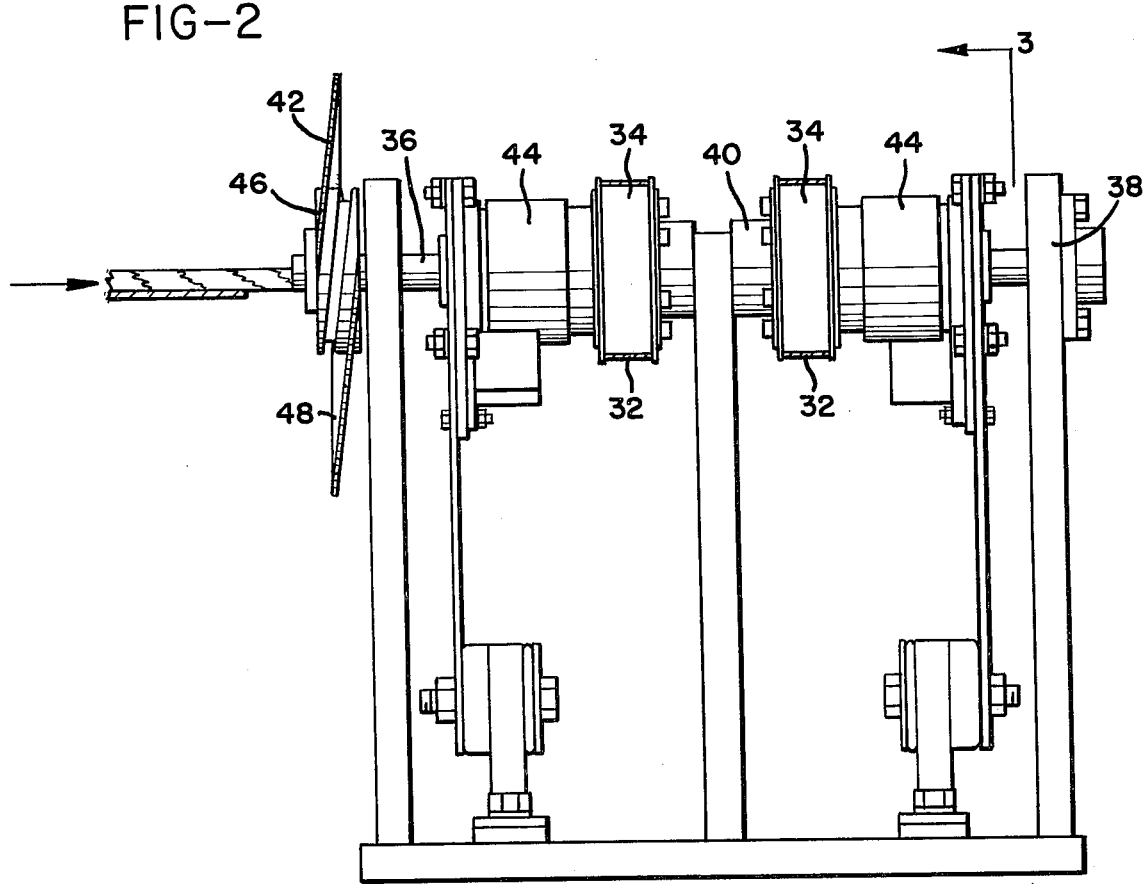
FIG. 2 is an elevational view showing the saw, one revolution clutches and pulleys.

A shaft 36 is journaled, as at 38 and 40, and carries a rotary blade 42 adjacent one of its ends. The shaft 36, as also seen in FIG. 2 of the drawings, carries a pair of brake-clutches 44, which may be energized to interconnect the pulleys 34 and the drive shaft 36. Members 44 may be any suitable, commercially available brake-clutch, such as the 24 volt DC brake-clutches manufactured by Precision Specialty Co., with a 360° stop adjustment.

With this construction, it will be seen that drive from motor 16 is transmitted to both the conveyor 12 and the drive shaft 36, so that they may be maintained in substantial synchronism, and that the brake-clutches 44 may be energized as desired to cause rotation of the blade 42, after which members 44 stop further rotation of the blade 42.

Figure 3:
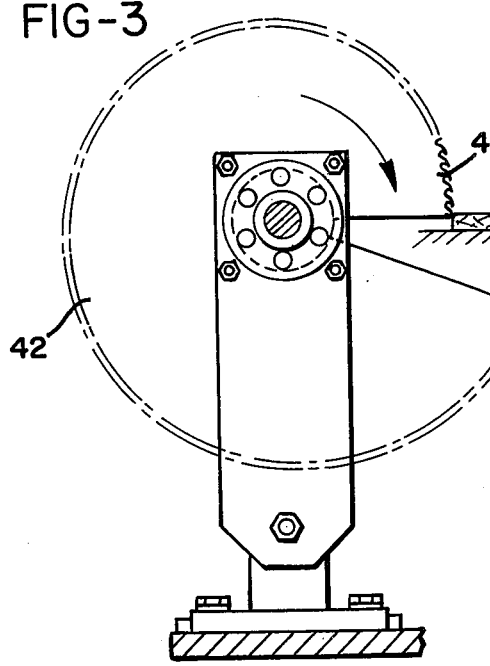
FIG. 3 is a view taken along line 3—3 with portions omitted for clarity.
Figure 4:
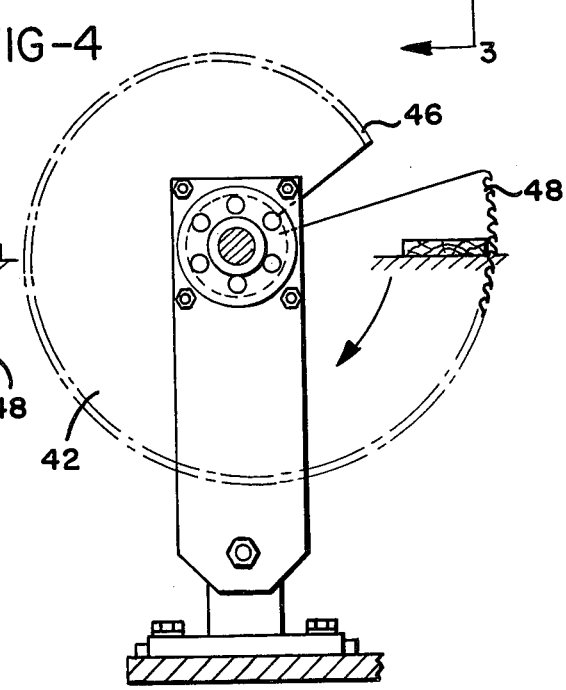
FIG. 4 is a view similar to FIG. 3 but showing the rotary blade near the completion of a cutting stroke.

The blade 42, as best seen in FIGS. 2–4 of the drawings, is substantially helically disposed about the axis of rotation thereof, with the leading edge 46 offset in an upstream direction from the trailing edge 48 and with the leading edge having a substantially smaller radius that the trailing edge to provide the spiral configuration best seen in FIGS. 3 and 4. It will also be noted from FIGS. 1, 5 and 6, that the axis of rotation of the blade 42 is angularly disposed with respect to the direction of movement of the conveyor 12.

With this construction it will be apparent that by correlating the rate of speed of the conveyor 12 with the rotational speed of the blade 42, its helical angle and its angular disposition with respect to the direction of movement of the conveyor, a piece of material to be severed will be cut along a line extending normally to the direction of movement of the conveyor as the material moves past the cutting station 10.

In this regard it should be noted that, because the actual cutting operation occupies only a small portion of the manufacturing process, the average throughput rate can be greatly increased by utilizing a two-speed drive for the drive 30, with the conveyor operating at relatively high speeds during the greater portion of time and decreasing to a second, lower speed only during actual cutting time. In this case, of course, the variables mentioned above would be correlated with the slower speed of the conveyor.

In cutting certain materials, such as wood for example, there is a danger of splinters being removed from the lower surface of the material as the saw blade cuts through the material. To prevent this problem the anvil construction shown in FIGS. 5–9 of the drawings is provided.

The anvil 50 consists of a fixed anvil member 52 and a movable anvil member 54. Fixed anvil member 52 has an edge 56 which extends at an angle to the direction of movement of the conveyor.

The angular disposition of edge 56 is related to the hexlix angle and the spiral of the blade 42 and the position of the blade with respect to the anvil, such that as the blade 42 revolves, its active cutting section, that is, that portion of the cutting edge of the blade which is actually cutting the material at any one instant, moves along a line parallel to and spaced a slight distance from the edge 56. Thus, at all times during a cutting stroke, the upstream portion of the material at the cut is supported by the stationary anvil 52.

Because of the helical travel of the blade 42 during a cutting stroke, a fixed anvil cannot be used at the downstream side of a cut. To provide support for the material being cut at this point, the movable anvil 54 is provided, pivotally mounted as at 58 adjacent one side of the conveyor. Movable anvil 54 is spring loaded by spring means (not shown) to the position shown in FIG. 5 of the drawings.

Figure 5:
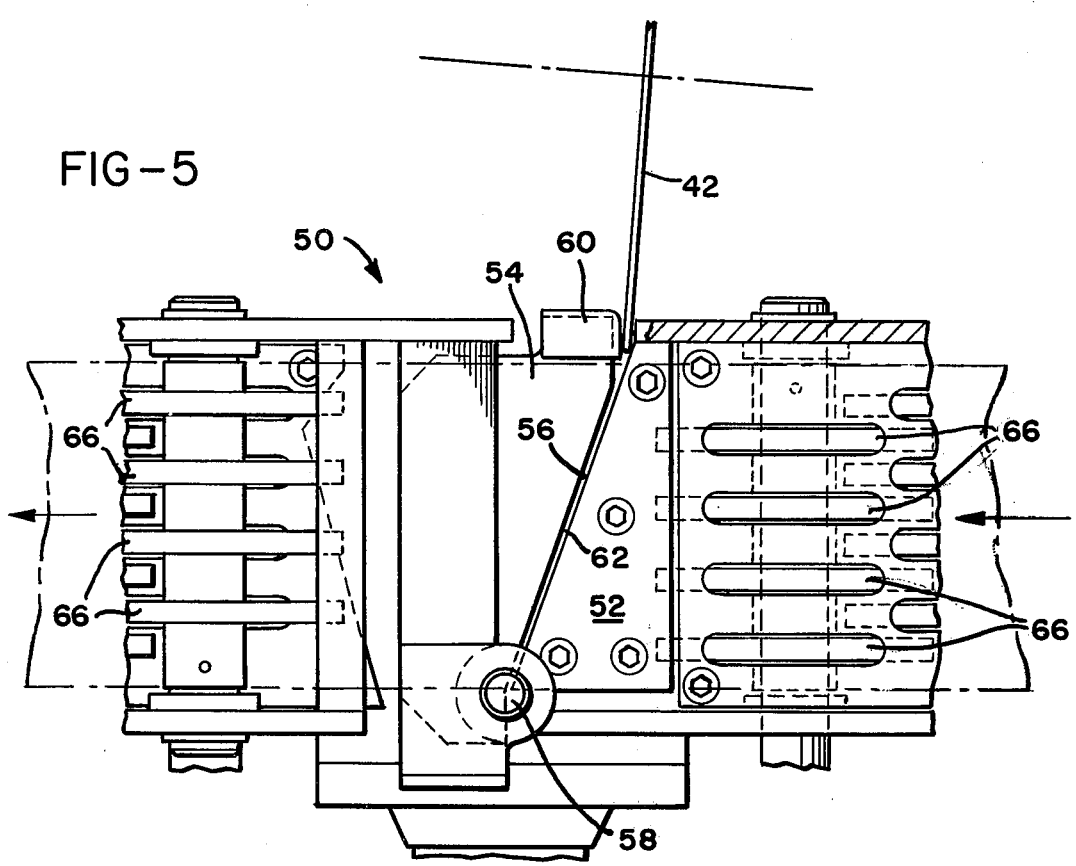
FIG. 5 is a plan view of the anvil system of the present invention.
Figure 6:
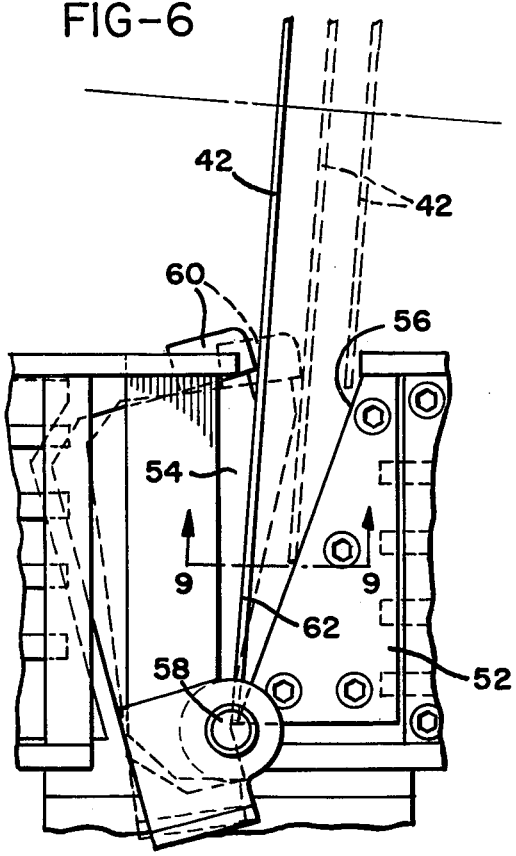
FIG. 6 is an enlarged view of a portion of FIG. 5 showing the displacement of the anvil during a cutting stroke.
Figure 7:
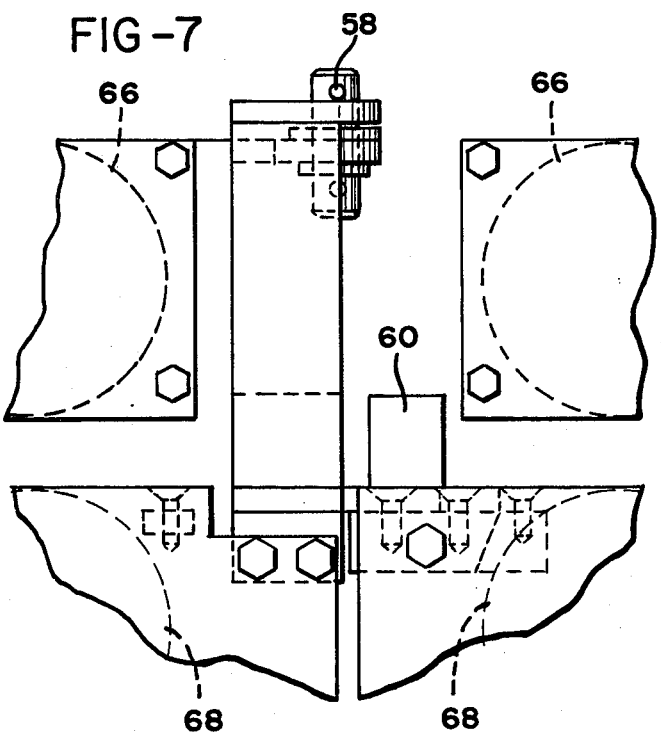
FIG. 7 is an elevational view showing the pivot for the movable anvil.
Figure 8:
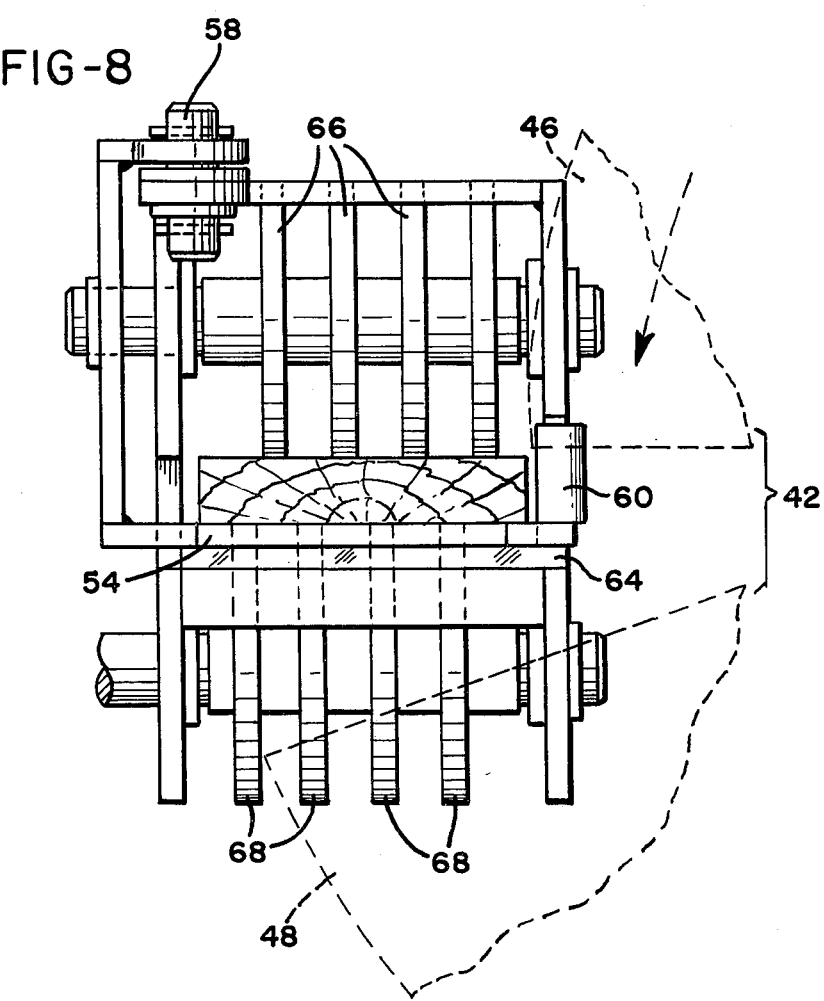
FIG. 8 is an end view showing the anvil, its support pivot, material between the conveyor and pressure rollers, and the saw in dotted lines.
Figure 9:
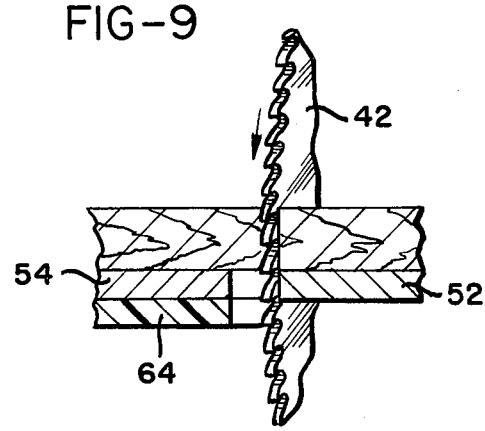
FIG. 9 is a view showing a portion of the saw assembly during a cutting stroke, taken generally along line 9—9.

It will also be noted that anvil 54 is provided with a cam 60 of Teflon or the like adjacent the blade 42. Therefore, as blade 42 moves across the conveyor line in a cutting stroke, the downstream face of the blade contacts the cam 60 and begins the initial pivoting action of the anvil 54, as best seen in FIG. 5 of the drawings. Continued rotation of the blade 42 will result, as seen in FIG. 6, in further pivoting of the anvil 54 until the anvil edge 62 engages the downstream face of the blade 42 and acts as a cam to continue pivoting movement of the anvil 54.

As a result, the edges 56 and 62 of the anvils 52 and 54 at the point where the active cutting section of the blade 42 is passing therebetween are separated by the thickness of the blade plus a small clearance, thereby providing support for the material being cut at both the upstream and downstream sides of the cut as it is being made.

To enhance the pivoting movement of the anvil 54 a block of material 64 having a relatively low coefficieint of friction supports the anvil during its pivoting movement. It will also be particularly noted from FIGS. 5–8 of the drawings that opposed upper and lower pressure rolls 66 and 68, respectively, are positioned at the cutting section 14 to engage the upper and lower surfaces of the material being cut.

From the above it will be seen that the present invention provides a saw assembly utilizing a helical, spiral blade which rotates about a fixed axis of rotation when connected to the drive train by means of a one stroke clutch-brake. It will also be seen that novel anvil means is provided to support the material being cut during the cutting operation to prevent ragged or splintered edges in the vicinity of the cut.

While the form of apparatus herein described constitutes a preferred embodiment of the invention, it is to be understood that the invention is not limited to this precise form of apparatus, and that changes may be made therein without departing from the scope of the invention.

What is claimed is:

1. A saw assembly comprising:
   a. means for conveying material to be sawed past a sawing station,
   b. saw means at said sawing station, including a rotary saw blade extending helically about the axis of rotation thereof with the leading and trailing portions of said rotary blade offset longitudinally of said axis of rotation and the radius of said rotary blade increasing spirally from a smallest dimension adjacent said leading portion thereof to a greatest dimension adjacent said trailing portion thereof,
   c. means for driving said rotary blade at a speed related to the helix angle thereof and the speed of said conveying means such that the active cutting section of said blade moves across material being conveyed past said sawing station to form a cut substantially normal to the direction of movement of said conveying means during the cutting stroke of said blade,
   d. anvil means extending horizontally beneath material being sawed at said sawing station for supporting the material on opposite sides of said active cutting section of said blade during a cutting stroke thereof, e. said anvil means including a movable anvil member having an edge extending in spaced relationship to a fixed anvil edge, and f. means pivotally mounting said movable anvil member for movement in a horizontal plane about an axis extending perpendicularly to said direction of movement of said conveying means.

2. A saw assembly comprising:

a. means for conveying material to be sawed past a sawing station, b. saw means at said sawing station, including a rotary saw blade extending helically about the axis of rotation thereof with the leading and trailing portions of said rotary blade offset longitudinally of said axis of rotation and the radius of said rotary blade increasing spirally from a smallest dimension adjacent said leading portion thereof to a greatest dimension adjacent said trailing portion thereof, c. means for driving said rotary blade at a speed related to the helix angle thereof and the speed of said conveying means such that the active cutting section of said blade moves across material being conveyed past said sawing station to form a cut substantially normal to the direction of movement of said conveying means during the cutting stroke of said blade, d. anvil means including fixed and movable anvil members extending horizontally beneath material being sawed at said sawing station for supporting the material on opposite sides of said active cutting section of said blade during a cutting stroke thereof, e. said fixed anvil member having an edge extending angularly across said direction of movement of said conveying means, f. the position of said edge of said fixed anvil with respect to said rotary blade and the angularity of said edge with respect to said direction of movement of said conveying means being such that said active cutting section of said blade remains at a substantially constant section travels along said edge during a cutting stroke, g. said movable anvil member having an edge extending in spaced relationship to said fixed anvil edge, and h. means pivotally mounting said movable anvil for movement in a horizontal plane about an axis extending perpendicularly to said direction of movement of said conveying means.

3. The assembly of claim 1 wherein said anvil means further comprises:

a. cam means mounted on said movable anvil adjacent said rotary blade and engagable by a downstream face of said blade to cause initial pivoting movement of said movable anvil during an initial portion of a cutting stroke.

4. A saw assembly comprising:

a. means for conveying material to be sawed past a sawing station, b. saw means at said sawing station, including a rotary saw blade extending helically about the axis of rotation thereof with the leading and trailing portions of said rotary blade offset longitudinally of said axis of rotation and the radius of said rotary blade increasing spirally from a smallest dimension adjacent said leading portion thereof to a greatest dimension adjacent said trailing portion thereof, c. means for driving said rotary blade at a speed related to the helical angle thereof and the speed of said conveying means such that the active cutting section of said blade moves across material being conveyed past said sawing station to form a cut substantially normal to the direction of movement of said conveying means during the cutting stroke of said blade, d. one stroke, clutch-brake means for interconnecting said drive means with said rotary blade for one cutting stroke only of said blade each time said clutch-brake is energized, e. anvil means at said sawing station extending horizontally beneath material being cut by said rotary blade at positions on opposite sides of said blade and at substantially constant spacing relative to said active cutting section of said blade, f. said anvil means comprising a fixed anvil member having an edge extending angularly across said direction of movement of said conveying means at an angle with respect to said direction of movement such that said active cutting section of said blade remains at a substantially constant spacing with respect to said edge as said active cutting section travels along said edge during a cutting stroke, and g. a movable anvil member cooperating with said fixed anvil member and having an edge extending in spaced relationship to said fixed anvil edge and mounted for pivotal movement in a horizontal plane about an axis extending perpendicularly to said direction of movement.

* * * * *

UNITED STATES PATENT OFFICE
CERTIFICATE OF CORRECTION

PATENT NO. : 3,901,114
DATED : August 26, 1975
INVENTOR(S) : Kenneth M. Cage

It is certified that error appears in the above—identified patent and that said Letters Patent are hereby corrected as shown below:

Inventor's middle initial should be --- M. --- not "C.".

Column 3, line 20, "that" should be --- than ---.

Signed and Sealed this second Day of December 1975

[SEAL]

Attest:

RUTH C. MASON
Attesting Officer

C. MARSHALL DANN
Commissioner of Patents and Trademarks